United States Patent [19]

Ohta et al.

[11] Patent Number: 4,579,775
[45] Date of Patent: Apr. 1, 1986

[54] STEERING WHEEL FOR AUTOMOBILE

[75] Inventors: Satoshi Ohta, Kounan; Masahiro Takimoto, Aichi, both of Japan

[73] Assignee: Toyoda Gosei Co., Ltd., Nishikasugai, Japan

[21] Appl. No.: 603,732

[22] Filed: Apr. 25, 1984

[30] Foreign Application Priority Data

Apr. 30, 1983 [JP] Japan .................. 58-76774

[51] Int. Cl.$^4$ .......................... B32B 3/26; B32B 5/14; B32B 27/30
[52] U.S. Cl. .................. 428/317.1; 74/552; 74/558; 428/318.6; 428/318.8; 428/319.1
[58] Field of Search ............... 74/558, 552; 150/52 M; 428/68, 71, 76, 304.4, 318.6, 318.8, 319.1, 317.1, 428/317.7, 64, 65, 66; 521/51

[56] References Cited

U.S. PATENT DOCUMENTS

| | | |
|---|---|---|
| 2,959,508 | 11/1960 | Graham et al. .............. 428/318.8 |
| 3,099,516 | 7/1963 | Henrickson ............... 428/318.8 |
| 3,523,464 | 8/1970 | Quillery et al. ............ 74/552 |
| 3,530,739 | 9/1970 | Meier ...................... 74/552 |
| 3,706,679 | 12/1972 | Hopton et al. ............. 428/318.8 |
| 3,764,642 | 10/1973 | Boutillier ................. 428/318.8 |
| 3,802,291 | 4/1974 | Young, Jr. et al. .......... 74/552 |
| 3,983,295 | 9/1976 | Murer et al. .............. 428/318.8 |
| 4,201,830 | 5/1980 | Wollen ..................... 74/552 |
| 4,353,266 | 10/1982 | Grothe ..................... 74/552 |
| 4,468,978 | 9/1984 | Takahara et al. ........... 74/552 |

Primary Examiner—William J. Van Balen
Attorney, Agent, or Firm—Cushman, Darby & Cushman

[57] ABSTRACT

A steering wheel for automobiles in which the coated part of the rim core bar comprises a soft foam with a skin layer. The soft foam with a skin layer result from expansion molding of a polyvinyl chloride plastisol. The polyvinyl choride plastisol is prepared by blending a paste resin with a plasticizer, a stabilizer, an expanding medium and other subsidiary materials.

5 Claims, 1 Drawing Figure 1  3  2

STEERING WHEEL FOR AUTOMOBILE

BACKGROUND OF THE INVENTION

1. Field of the Invention

The present invention relates to a steering wheel for automobiles and more particularly to a steering wheel characterized by the material of coated part of its rim core bar.

2. Description of the Prior Art

As the material of coated parts of rim core bars in a steering wheel, there have been usually used hard polypropylene or soft polyurethane foams (of the integral skin type). The former material is solid, leading to an increase in the weight of steering wheel and the touch in grasping its rim is also hard, allowing the hotness or coldness of the rim to be directly felt, so that this material is not desirable. The latter material can be free from these defects, but it has poor light-resistance and is markedly expensive in material cost as compared with the former material. The latter material has also disadvantageous properties such as severe molding conditions and poor productivity due to a two-pack type of formulation.

SUMMARY OF THE INVENTION

The present invention relates to a steering wheel characterized by the material of the coated part of its rim core bar. The coated part of the rim core bar comprises a soft foam with a skin layer resulting from expansion molding of a polyvinyl chloride plastisol.

Therefore, the object of the present invention is to provide a steering wheel in which the coated part of its rim core bar comprises a soft foam with a skin layer, at a low cost and that is easy to fabricate.

DESCRIPTION OF THE PREFERRED EMBODIMENT

Figure 1:
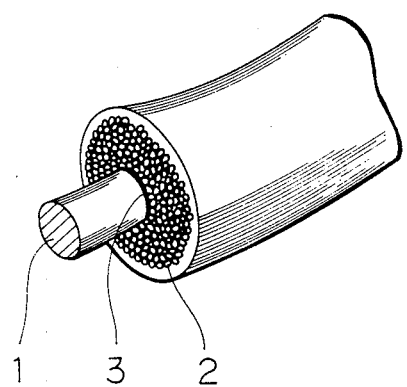
FIG. 1 is a perspective view, with part cut off, of the rim part which embodies one example of a steering wheels made in accordance with the present invention.

In a steering wheel made in accordance with the present invention, the coated part 2 of the rim core bar 1 comprises a soft foam with a skin layer resulting from the expansion molding of a polyvinyl chloride plastisol. Further, a material 3 is an adhesive layer, though it is not essential to the steering wheel made in accordance with the present invention and e.g. a material with a vinyl chloride-vinyl acetate copolymer base is used as the material 3.

The polyvinyl chloride plastisol used in the present invention is a dispersion in which a special polyvinyl chloride resin, termed a paste resin, is mixed and dispersed in a liquid plasticizer together with a stabilizer, an expanding medium and other subsidiary materials. The mixing is carried out using a conventional means such as a Hobart-type batch mixer or an Oakes-type continuous mixer.

The paste resin used in the present invention is a fine powder-shaped homopolymer or copolymer of a particle size of $10^{-5} \sim 10^{-7}$ cm obtained by the homopolmerization of vinyl chloride or the copolymerization of it with other vinyl monomer such as vinyl acetate in an emulsion. The paste resin is soluble slightly (i.e., only on its surface layer) in a plasticizer at a normal temperature, so that it can form an organosol, i.e., a plastisol.

Further, it is preferable to prepare a crosslinked paste resin from the viewpoint of the requirements of steering wheels particularly with respect to wear resistance and mechanical strength. The crosslinking methods include a crosslinking method for a polymer having an OH group introduced at its terminals with a polyisocyanate or the like and a crosslinking method for a polymer by a dehydrochlorination reaction between chlorine within the polymer and triazine or the like.

As the above-mentioned liquid plasticizer, there is used a single plasticizer or a mixture of two or more plasticizers of the following phthalate-containing plasticizers such as di-(2-ethylhexyl) phthalate, dibutyl phthalate, dinonyl phthalate, diisodecyl phthalate and diundecyl phthalate; aliphatic dibasic acid ester-containing plasticizers such as dioctyl adipate, diisodecyl adipate and dioctyl sebacate; phosphate-containing plasticizers such as trioctyl phosphate and triphenyl phosphate; epoxy-containing plasticizers such as epoxy soyabean oil; polyester-containing plasticizers such as polypropylene adipate; and aromatic carboxylic acid-containing plasticizers such as trioctyl trimellitate. Further, it is preferable to use the above-mentioned phthalate-containing plasticizers having an alcohol carbon number of 9 and over which have low volatility and excellent viscosity stability, from the viewpoint of low fogging properties required for a steering wheel and of flow properties of sol.

The stabilizer is blended for improving the heat resistance and light resistance required for a steering wheel. As the stabilizer, a single stabilizer is used or a mixture of two or more kinds of the following stabilizers, which are metal soaps such as lead stearate, barium stearate, cadmium stearate and zinc stearate; tin stabilizers such as dibutyltin dilaurate, dibutyltin maleate, organic tin mercaptide and organic tin sulfonamide; and lead stabilizers such as tribasic lead sulfate, dibasic lead phosphite, tribasic lead maleate and dibasic lead sulfate. As a stabilizer having a heat stability effect which is to be combined with a tin stabilizer having an excellent light stability effect, the above-mentioned, non-toxic epoxy-containing plasticizer is preferably used. For the same purpose, a lead stabilizer having an excellent heat stability effect may be used, but the lead stabilizer is not desirable from the viewpoint of environmental hygiene for it has toxicity.

The above-mentioned expanding medium means an expanding agent in the sense of a chemical expansion, a foam stabilizer in regard to mechanical expansion or a high pressure gas or a volatile organic solvent introduced into a sol in physical expansion.

As the above-mentioned expanding agent, there can be cited organic ones such as azodicarbonamide, azobisisobutyronitrile, benzene sulfonyl hydrazide and N-N'-dinitrosopentamethylenetetramine and inorganic ones such as sodium bicarbonate, sodium borohydride and ammonium carbonate which both have a decomposition temperature of 90° ~ 120° C.

As the above-mentioned foam stabilizer, there is used an organic surface active agent such as sodium alkylbenzene sulfonate, potassium alkylbenzene sulfonate or a silicone oil such as dimethylpolysiloxane or methylphenylpolysiloxane.

As the above-mentioned high pressure gas used in physical expansion, there can be cited inert carbon dioxide, nitrogen, air and the like, and as the above-mentioned volatile organic solvent used for the same purpose, there can be cited n-pentane, petroleum ether, hexane and the like having a low boiling point.

The above-mentioned subsidiary materials include fillers such as calcium carbonate and clay, lubricants such as higher fatty acid derivatives, and pigments for coloring. In addition, when a paste resin is to be crosslinked, a crosslinking agent such as polyisocyanate or triazine and further an acid-accepting agent (only when the crosslinking agent is triazine) are blended with the paste resin.

After a polyvinyl chloride plastisol prepared as mentioned above (and further stirred to foam in the case of mechanical expansion) has been injected into a mold having a core bar for a steering wheel set within it, the mold is heated at 160°~220° C. for 10~60 min, and subsequently is cooled before being opened. By this process, a steering wheel can be obtained in which the coated part of the rim core bar comprises a soft foam the with a skin layer resulting from expansion molding of a polyvinyl chloride plastisol.

EXAMPLE 1

A plastisol for mechanical expansion having the composition shown below was sufficiently stirred to foam in a Hobart-type mixer employing a whipper and then was injected into a mold having the core bar set within it. Then, the mold was heated by a heating furnace at 210° C. for 20 min, and, after that, the mold was cooled with water for 5 min before being opened. Thus, a steering wheel made in accordance with the present invention was obtained. The steering wheel had a good appearance and also the touch in grasping its rim was soft. Further, the foam part of the steering wheel had a density of 0.6 g/cm$^3$.

| Composition | (unit: parts by weight) |
| --- | --- |
| Paste resin | 100 parts |
| (for crosslinking with isocyanate, DP: 1300) | |
| Plasticizer | 50 parts |
| (mixed phthalates-containing, M: 444) | |
| Stabilizers | |
| Organic tin mercaptide | 3 parts |
| Epoxy soyabean oil | 3 parts |
| Foam stabilizer (silicone oil) | 3 parts |
| Crosslinking agent (polyisocyanate) | 8 parts |

EXAMPLE 2

A plastisol for mechanical expansion having the composition shown below was mixed in a Hobart-type mixer and air was introduced into the sol to foam it using a C-type continuous expanding machine manufactured by Aeromatic Co. Then, the sol was injected into a mold having the core bar set within it, and after that, the mold was heated by a heating furnace at 200° C. for 40 min, and then the mold was cooled with water for 5 min before being opened. Thus, a steering wheel made in accordance with the present invention was obtained. The steering wheel had a good appearance and also the touch in grasping its rim was soft. Further, the foam part of steering wheel had a density of 0.52 g/cm$^3$.

| Composition | (unit: parts by weight) |
| --- | --- |
| Paste resin | 70 parts |
| (for crosslinking with triazine, DP: 850) | |
| Resin for blend (DP: 1000) | 30 parts |
| Plasticizer | 60 parts |
| (phthalate-containing, M: 474) | |
| Stabilizer | |
| Ba—Zn—containing metal soap | 3 parts |
| Epoxy soyabean oil | 3 parts |
| Foam stabilizer (silicone oil) | 4 parts |
| Crosslinking agent (triazine-containing) | 20 parts |
| Acid-accepting agent (magnesium oxide) | 2 parts |

What is claimed is:

1. A steering wheel for automobiles comprising a rim core bar having a foamed polymeric coating attached thereto in which the polymeric coating comprises a soft, resilient foam with an integral skin layer thereon, wherein said soft, resilient foam with said integral skin layer results from the expansion molding of a polyvinyl chloride plastisol, which plastisol consists essentially of a polyvinyl chloride paste resin blended together with a plasticizer, a stabilizer, an expanding medium and other subsidiary materials.

2. The steering wheel of claim 1 in which the plastisol also contains a crosslinking agent to crosslink the vinyl chloride polymer.

3. The steering wheel of claim 1 in which the particles of the polyvinyl chloride paste resin are in the range of about $10^{-5}$ to about $10^{-7}$ cm.

4. The steering wheel of claim 1 in which the plasticizer is a phthalate-containing plasticizer having at least 9 carbon atoms.

5. The steering wheel of claim 1 in which an adhesive layer secures the foam to the rim core.

* * * * *